United States Patent [19]

O'Dell et al.

[11] Patent Number: 4,593,497
[45] Date of Patent: Jun. 10, 1986

[54] ABRASIVE SEAL RECOVERY SYSTEM

[75] Inventors: David L. O'Dell; Philip H. Diehn, both of Mishawaka, Ind.

[73] Assignee: Wheelabrator-Frye Inc., Mishawaka, Ind.

[21] Appl. No.: 587,549

[22] Filed: Mar. 8, 1984

[51] Int. Cl.$^4$ .............................................. B24C 9/00
[52] U.S. Cl. ....................................... 51/424; 51/429; 51/437; 51/319
[58] Field of Search .......... 51/424, 425, 429, 436–437, 51/319–320

[56] References Cited

U.S. PATENT DOCUMENTS

| | | | |
|---|---|---|---|
| 2,455,514 | 12/1948 | Mead | 51/319 X |
| 3,448,544 | 6/1969 | Cardon | 51/429 X |
| 3,598,446 | 8/1971 | Hatcher | 51/424 X |
| 4,020,597 | 5/1977 | Shigyo et al. | 51/424 |
| 4,132,039 | 1/1979 | Gilbert et al. | 51/429 X |
| 4,470,226 | 9/1984 | Williams | 51/425 X |

*Primary Examiner*—James G. Smith
*Assistant Examiner*—Debra S. Meislin
*Attorney, Agent, or Firm*—McDougall, Hersh & Scott

[57] ABSTRACT

Apparatus and process for the recovery of particulate material lost during the passage of a surface treatment blast head having a magnetic particle seal over the surface under treatment. Wipers adapted to substantially contain the leakage material are spaced in close proximity around the outside perimeter of the magnetic seal. One or more slotted vacuum tubes are positioned between the magnetic seals and the wipers; each vacuum tube being interconnected by hoses or pipes to a recovery chamber which, in turn, is operatively interconnected with the blast head through a material transfer valve. The recovery chamber is further provided with a vacuum flapper valve adapted to selectively inhibit the flow of vacuum air through the chamber and slotted vacuum tube. During a first step the vacuum valve is open and the material transfer valve is closed. In this configuration, vacuum air and leakage material is drawn into the recovery chamber through the slotted vacuum tube and the recovered leakage material is retained therein for subsequent recycling. During a second step the vacuum valve is closed and the material transfer valve is open thereby facilitating the transfer of recovered leakage material to the blast head for reuse.

8 Claims, 3 Drawing Figures

ABRASIVE SEAL RECOVERY SYSTEM

This invention relates to the treatment of surfaces by projection of a particulate material onto the surface to be treated and, more particularly, to means for confining the particulate material projected onto the surface while permitting relative movement between the device and the surface.

The invention will be described with reference to a portable device embodying an airless blasting wheel for projection of particulate material onto a surface to be treated. It will be understood, however, that the invention has application also to the other devices whereby particulate material is projected by other means onto a surface of treatment.

Airless blasting wheels are well known to the art. Such wheels, which are marketed by Wheelabrator-Frye Inc. under the trademark WHEELABRATOR, comprise a plurality of circumferentially spaced apart blades which extend radially outwardly from a central hub with means for feeding particulate material onto the inner ends of the blades whereby the material is displaced along the surfaces of the blades in response to rapid rotational movement of the wheel and are thrown at high velocity from the ends of the blades onto the surface to be treated. Depending somewhat upon the type of surface treatment, that is cleaning, abrading, peening or the like, the treating material is selected of abrasive particles, steel shot, steel grit and the like particulate materials.

In the use of such devices for blasting or impacting surfaces with the particulate material, it is desirable to confine the space about the surface being treated to permit recovery of particulate material and to prevent the development of hazardous conditions resulting from the richocheting of particulate material into the surounding atmosphere. In a portable device which is moved over the surface, the blast housing cannot be permanently attached to the surface to effect the desired sealing relation. The desired sealing relation is further complicated by the fact that the surfaces are not even so that variations are encountered in the spaced relation between the blast head and the surface.

With a view towards overcoming these problems, attempts have been made to make use of flexible sealing members formed of rubber or polyurethane to conform to the surface. These materials are so rapidly eroded by the blast of particulate materials as to require frequent replacement. In addition, a considerable amount of pressure must be applied to such sealing members in order to achieve conformance with the contour of the surface. Thus, such flexible sealing members are handicapped by very short seal life and require frequent replacement.

Alternatively, it has been found that seals formed of the abrasive material, itself, magnetically retained around the perimeter of the blasting zone by permanent magnets on the housing, are both durable and dust tight. Further, by its viscous nature a magnetically formed abrasive seal dissipates the energy or impact of the flying particles thereby minimizing the wear of the structural system components. Such a seal is described in U.S. Pat. No. 4,319,436, assigned to the present assignee.

Magnetic abrasive seals, however, exhibit certain leakages or particle losses, not from blast penetration, but due to blast head movement over the surface being treated. These particles, in essence, 'rub-off' the seal at its point of surface contact and, therefore, are lost and cannot be recycled. The present invention is directed to a system for the recovery and recycling of these particles and, more specifically, to an arrangement adapted to recover such particles irrespective of the upward or downward movement of the blasting head along the surface being treated.

Substantially complete lost particle recovery is achieved by the present invention characterized by a combination of wiper members and slotted vacuum recovery tubes spaced slightly outside, but in close proximity to, the magnetic abrasive seals. The particles thus recovered are deposited for temporary retention within leakage recovery chambers prior to return to the blast head chamber.

The loss of abrasive particles is generally limited to the seal along the trailing side or edge of the blasting chamber. Thus, when working against a vertical surface for example, leakage occurs along the bottom of the blast chamber for upward travel of the blast head and, conversely, along the top of the chamber for downward movements of the head. The present invention advantageously utilizes this characteristic to provide sequential and alternately synchronized seal leakage recovery and transfer to the blast head. More specifically, vacuum is applied to one of the slotted recovery tubes through the leakage recovery chamber then, upon reversal of the direction of head travel, vacuum is removed from the recovery chamber facilitating particle transfer therefrom to the blast head chamber.

It is therefore an object of this invention to provide a sealing means for portable blasting equipment whereby the particulate material is effectively confined within the blast housing while materially reducing the amount of seal wear, drag force and pressure required to maintain the blast head in sealing engagement with the surface during treatment thereof. The seal shall be comprised of the particulate material, itself, retained around the blast zone by permanent magnets along the perimeter of the blast head opening. It is a further object to minimize losses of particulate material comprising the seal. Means spaced outwardly of particulate seal shall be provided to capture leakage material and return such material for reuse. These means shall preferably comprise a combination of wipers and slotted vacuum tubes. It is a further object that the leakage collection system shall be adapted for blast head movement in at least two directions and, further, that the collection apparatus be synchronized with such movement thereby to facilitate particulate recovery and recycling.

These and other objects and advantages of this invention will hereinafter appear and for purposes of illustration, but not of limitation, a preferred embodiment of the invention is shown in the accompanying drawings in which.

DESCRIPTION OF THE PREFERRED EMBODIMENT

The invention will be described with particular reference to a portable centrifugal blasting device in which the particulate material is steel shot or grit for peening or cleaning a metal surface, such as a ship's hull or storage tank, for the removal of rust, dirt or paint.

Figure 1:
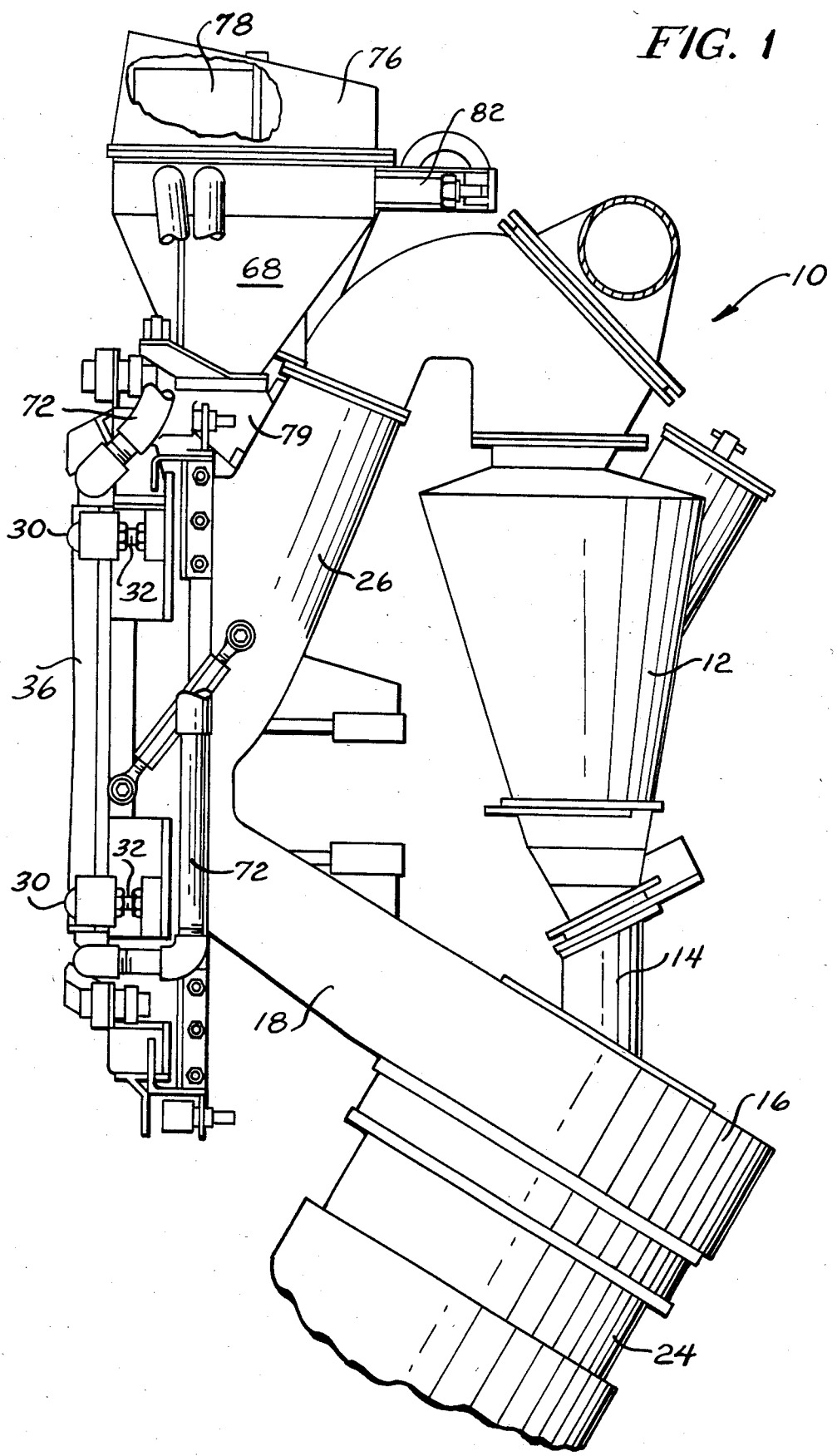
FIG. 1 is a side elevation view of the portable surface treating apparatus including the particle seal and leakage particle recovery and recycling of the present invention.
Figure 2:
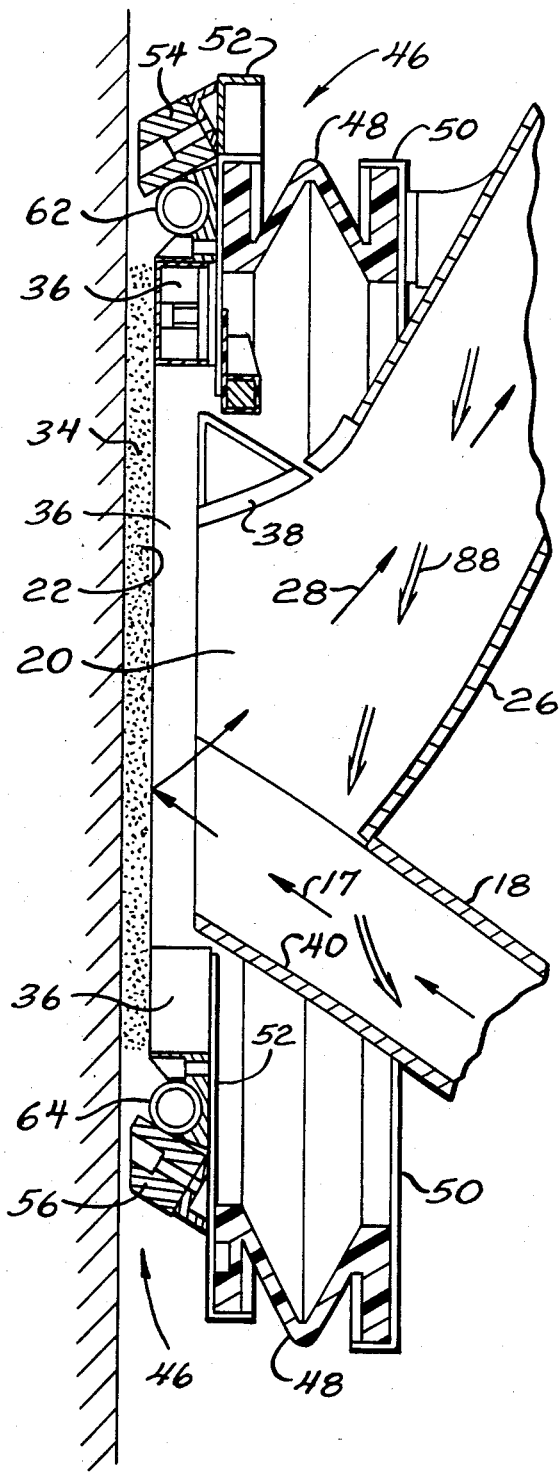
FIG. 2 is a side elevation view of the blast head, partially in section with portions broken away, illustrating placement of the seal magnets, particle seal, slotted vacuum tubes, and wipers; and, FIG. 3 is a front elevational view looking into the blast head as seen from the treatment surface illustrating the particle recovery and recycling of the present invention.

Referring to FIGS. 1 and 2, a portable blasting device 10 is shown in which steel shot is fed from a hopper 12 through a feed tube 14 to impeller of a multi-bladed centrifugal blast wheel 16 mounted for rotational movement therein. The steel shot is then projected, as depicted by arrows 17, at substantial velocity through corridor 18 and blast opening 20 onto the treatment surface 22. An electrical motor 24 is provided to rotate the blasting wheel at high angular velocity as required to propel the shot.

Upon impact with the surface 22, the shot rebounds with sufficient kinetic energy for travel through an upwardly inclined rebound corridor 26, as illustrated by arrows 28, for return to the hopper 12. An air wash of conventional construction may be included in the return for the removal of dust and dirt from the steel particles which are returned to the hopper for reuse.

In operation, the blasting apparatus 10 is held in spaced relationship against the treatment surface 22 by four rollers 30 positioned generally along the side edges, or corners, outside of the seals and particle recovery wipers defining the blast opening 20. Rollers 30 are mounted on spindles 32 adapted to be adjustable in length for varying the spacing between the blast head and the surface.

The seal 34 between the blast head and the surface is formed of the particulate material, generally steel shot or grit, held together by magnetic attraction induced by permanent magnets 36 mounted immediately adjacent the top, bottom, and side walls of the blast head. Since the seal is formed of the particulate material projected through the blast head onto the surface, the seal will automatically form almost immediately from the initial material thrown through the blast head onto the surface.

Blast head opening 20 is defined at the convergence of blast and rebound corridors 18 and 26, respectively, and is further defined by the enclosure formed of a top wall 38, bottom wall 40, and side walls 42 and 44. The magnetic seal and leakage recovery assembly, shown generally as 46 in FIG. 2, is affixed to the blast head by means of a flexible spring bellows 48 adapted to bias rollers 30 of assembly 46 against treatment surface 22 for sliding contact therewith. The bellows is received in, and affixed to, a backplate 50 which, in turn, is rigidly attached to the blast head corridors. In similar fashion, a front plate 52, adapted to carry the sealing magnets and leakage recovery wipers and slotted vacuum tubes, is retained at the forward portion of bellows 48. In addition, the rollers 30 and spindles 32 are rigidly affixed to this forward plate 52 as necessary to properly position the seal and recovery assembly adjacent the treatment surface.

Figure 3:
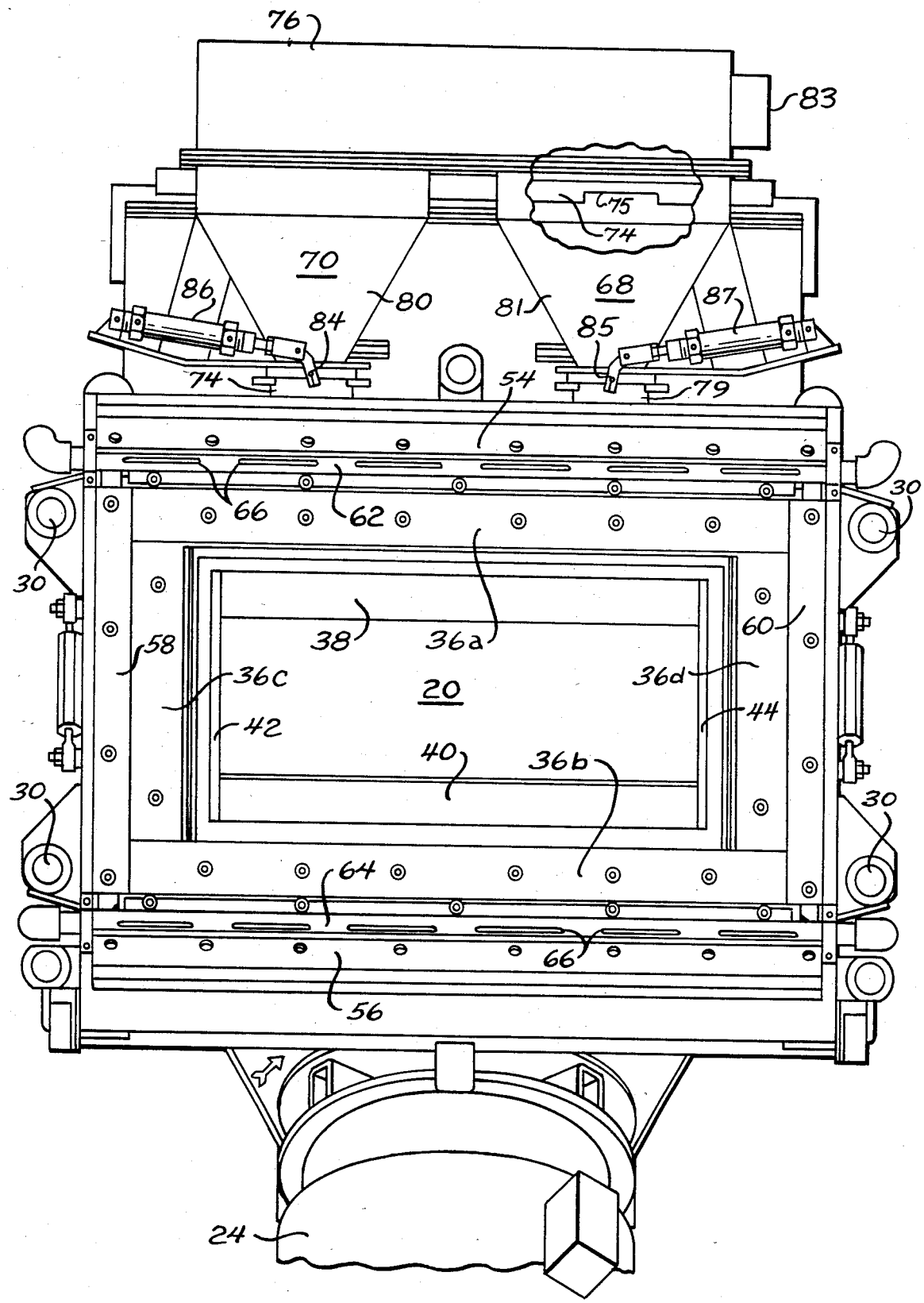

Referring to FIG. 3, four permanent magnets 36a-d are mounted to plate 52 outwardly of the perimeter as defined by the previously considered blast opening walls. As is best shown in FIG. 1, rollers 30 extend beyond the plane defined by magnets 36 thereby spacing these magnets approximately one-half inch away from the treatment surface during blasting operation. In this manner a magnetic seal of about 3 inches in width and one-half inch in thickness is formed around and completely enclosing the blast opening 20.

The present use of magnetic particulate material produces a very durable dust tight seal having a low drag coefficient as the blast head is moved over the treatment surface. However, the movement of the blast head over such a surface results in the loss or leakage of particulate material comprising the seal. Specifically, particulate seal material is lost or left behind in trailing fashion as the head moved. Thus, the loss of particulate material is substantially limited to one side of the blast chamber defining the trailing edge thereof.

The leakage material recovery system of the present invention utilizes a combination of wipers spaced around the magnetic seal outwardly of its perimeter and slotted vacuum tubes along the trailing chamber edges to achieve virtually complete lost particulate material recapture and recycling. In addition, the present system incorporates gated synchronized recovery chambers to facilitate, as described below, the transfer of the recovered particles to the blast chamber for reuse.

Referring again to FIG. 3, an upper wiper 54, a lower wiper 56, and a pair of side wipers 58 and 60 are attached to forward bellows plate 52 along the outside perimeter thereof. These wipers are retained in close proximity to the treatment surface and form a substantially closed wiper loop surrounding the blast zone and magnetic seal. The wipers function to contain substantially all the leakage therefrom and as venturis to accelerate incoming air to the slots, assisting in shot recovery.

Operating in conjuction with the above described wiper containment assembly are sequential and synchronized apparatus adapted to recover and recycle the leakage abrasive particulate matter contained adjacent the magnetic seals. Such apparatus includes one or more vacuum tubes 62 and 64, having longitudinal slots 66 therein, coupled to leakage recover chambers 68 and 70. Each slotted vacuum tube is positioned parallel to and between a seal magnet 36 and its respective wiper. The slots 66, therein, are oriented generally toward the treatment surface.

It will be appreciated that separate slotted tubes are required, adjacent the seal defining the trailing edge, for each direction of blast head movement contemplated. Thus, one, two, three or four vacuum recovery sub-systems may advantageously be used. In the embodiment depicted in the drawings, slotted vacuum recovery is provided along the upper and lower seals thereby permitting head travel in the downward and upward directions, respectively. Movement in sideways direction is possible with the embodiment depicted, although leakage recovery is diminished in that direction.

Separate recovery chambers are preferably provided for each slotted recovery sub-system. Referring to FIGS. 1 and 3, recovery chambers 68 and 70 are interconnected by appropriate pipes or hoses 72 with slotted vacuum tubes 62 and 64, respectively. Each pipe 72 is received into its respective recovery chamber in airtight fashion and defines an apertured pipe segment 74 therein pipes 74 include openings or apertures 75 through which air and particulate material may pass.

Recovery chambers 68, 70 are each comprised of an upper vacuum region 76 selectively coupled by a flapper valve 78 to a lower funnel-shaped particulate material collection hopper 80, 81. A vacuum source (not shown) is connected at 83 to the recovery chamber upper vacuum regions. In the present embodiment a single flapper valve 78 alternately restricts the vacuum-induced intra-chamber flow of air from hoppers 80, 81 to the vacuum region 76. In a first flapper position, free circulation through chamber 68 is provided while the flow through chamber 70 is blocked and, in the second flapper position, the converse flow condition prevails. A hydraulic cylinder 82 is provided to actuate flapper 78, as described more fully below, in synchronism to the direction of blast head travel. The apertured pipes 74 are positioned in the upper portion of the recovery chamber hoppers 80, 81 such that no vacuum-induced airflow occurs through a pipe 74 within a given chamber when the flapper valve is closed with respect to that chamber.

The bottom of each hopper 80, 81 operatively interconnects to rebound corridor 26 through a neck pipe 79. A recovery valve 84, 85 within each neck pipe 79 permits selective communication between hopper 80, 81 and the rebound corridor 26. A hydraulic actuator 86, 87 selectively operates each recovery valve 84, 85 in synchronization with flapper valve 78 which, in turn, is synchonized to the direction of blast head travel. Specifically, a given recovery valve 84, 85 is open whenever the path of intra-chamber air communications is closed by flapper valve 78 and closed when the air path is open.

Each recovery chamber operates in a sequential two-step mode. With the recovery valve 84, 85 closed and the flapper valve 78 open, the vacuum applied to the upper vacuum chamber 76 induces an air flow into the slotted vacuum tubes 62, 64, through hoses 72, and, in turn, into the recovery chamber through the apertured pipe segment 74. The air is thereafter drawn upwardly past the open flapper valve into the vacuum region 76 of the recovery chamber, then, to the source of vacuum through outlet 83. The air drawn into the slotted vacuum tube generally contains leakage particulate material which, in turn, is discharged through the apertured pipe segments into the recovery chamber. This material, due to its weight, drops and collects on the bottom of the recovery chamber hopper 80, 81 until the associated recovery valve 84, 85 is subsequently opened. A secondary vacuum abrasive trap of conventional design (not shown) may be provided to collect minor residual particulate material occasionally carried by the force of the air current through outlet 83.

The second step commences upon flapper 78 closure and the corresponding and synchronized opening of recovery valve 84, 85. In this configuration, vacuum air flow into the upper vacuum chamber 76 is cut-off which, in turn, similarly precludes air from entering the chamber through the apertured pipes 74. Thus, the hopper is substantially at atmospheric pressure. Operation of the associated vacuum recovery tube 62,64 is interrupted during this transfer interval.

Referring to FIG. 2, the particulate material that previously accumulated in the hopper is now dumped into the rebound corridor 26 of the blast head where it, in turn, falls downwardly, as illustrated by arrows 88, into the blast corridor 18 and, ultimately, into the blast wheel or the flying stream of abrasive where it is again propelled at high velocity against the treatment surface. In this manner the particulate material lost as leakage from the magnetic seals is recovered and recycled to perform useful work as abrasive shot.

The above described two-step recovery chamber operation assures proper transfer of particulate material by eliminating hopper 80, 81 vacuum during the second or transfer step which, otherwise, would operate to inhibit the free downward flow of particulate material and, potentially, precipitate a reverse direction, upward material flow. The interruption of vacuum tube 62,64 operation along one side of the blast area is easily accommodated in the present portable blasting apparatus adapted for repetitive and alternating head movements in differing directions. As previously indicated, particulate material is generally lost only from the trailing head seal and, therefore, the vacuum recovery along the three remaining seals may be interrupted without compromising system performance.

Surface treatment operation of the present embodiment depicted in the drawings occurs by alternately moving the blast head upwardly and downwardly in successive adjacent parallel tracks. It will be appreciated that the present invention is equally adapted for lateral travel as well as treatment of horizontally disposed surfaces and, as previously mentioned, additional recovery subsystems may be added to facilitate leakage recovery for head movement in any cardinal direction without the repositioning thereof.

During operation of the present apparatus in the downward direction, hydraulic cylinder 82 positions the flapper valve 78 for vacuum air communication through recovery chamber 68 which, in turn, enables the upper slotted vacuum tube 62 for recovery of particulate leakage material from the trailing magnetic seal 36a of the downwardly moving blast head. Transfer valve 85 of this chamber is closed thereby retaining the recovered abrasive material for interim storage therein. Chamber 68 is operating in the first or recovery step of the two step recycling process. In complementary fashion, chamber 70 is operating in the second or transfer step in which vacuum air communication is blocked and transfer valve 84 is held in the open position by hydraulic cylinder 86. Thus, operation of the forward or leading slotted vacuum tube 64 is inhibited by the absence of vacuum air flow therethrough. Abrasive material recovered and retained in hopper 80 during the preceding upward pass of the blast head is permitted to enter the blast head for reuse as previously described.

In similar fashion, during upward travel of the blast head, hydraulic cylinder 82 repositions the flapper valve 78 for vacuum air communication through recovery chamber 70 which, in turn, enables the lower slotted vacuum tube 64 for recovery of particulate leakage material from the now trailing magnetic seal 36b. Transfer valve 84 of this chamber is closed thereby retaining the recovered abrasive for interim storage therein. Chamber 70 is operating in the recovery step while chamber 68 has switched to the transfer mode in which the leakage material previously recovered during the downward pass of the blast head is dumped into the blast head through the now opened valve 85. In this manner the present recovery system alternately recovers and recycles leakage abrasive material lost from the blast head magnetic seals.

What is claimed:

1. In a blasting device having a blast head with an opening through which particulate material is projected at high velocity onto a surface for the treatment thereof, the device including sealing means around the opening adapted to contain most of the blasted particulate material within the blasting device for recycling; means for recovering and recycling particulate leakage material not contained by the sealing means including suction means adjacent the sealing means adapted for removing said leakage particulate material and means for returning the removed leakage particulate material to the blasting device for reuse; the means for returning the removed particulate material includes a recovery chamber having a particulate material storage hopper, means for removing the stored particulate material from the hopper for reuse, a leakage particulate material inlet adapted to receive particulate material from the suction means, hose means interconnecting the suction means and the leakage material inlet; the recovery chamber having a vacuum inlet adapted for connection to a source of vacuum air, vacuum air means, means interconnecting the vacuum air means and the vacuum air inlet of the recovery chamber whereby the vacuum means draws air and leakage particulate material from adjacent the blast head into the suction means, through the hose means and into the recovery chamber wherein the leakage particulate material is retained in the storage hopper as the air is further drawn to the vacuum air means; the means for removing the stored particulate material from the recovery chamber hopper for reuse includes passage means at the bottom of the hopper interconnecting the recovery chamber and the blast head through which particulate material in the recovery chamber hopper may be transferred to the head for reuse; wherein the blast head includes a blast corridor for directing particulate material at high velocity against a surface to be treated and a rebound corridor for returning the particulate material for reacceleration by the blast head; the passage means entering the blast head in the rebound corridor.

2. In a blasting device having a head with an opening through which particulate material is projected at high velocity onto a surface for the treatment thereof, the device including sealing means around the opening adapted to contain most of the blasted particulate material within the blasting device for recycling; means for recovering and recycling particulate leakage material not contained by the sealing means including suction means adjacent the sealing means adapted for removing said leakage particulate material and means for returning the removed leakage particulate material to the blasting device for reuse; the means for returning the removed particulate material includes a recovery chamber having a particulate material storage hopper, means for removing the stored particulate material from the hopper for reuse, a leakage particulate material inlet adapted to receive particulate material from the suction means, hose means interconnecting the suction means and the leakage material inlet; the recovery chamber having a vacuum inlet adapted for connection to a source of vacuum air, vacuum air means, means interconnecting the vacuum air means and the vacuum air inlet of the recovery chamber whereby the vacuum means draws air and leakage particulate material from adjacent the blast head into the suction means, through the hose means and into the recovery chamber wherein the leakage particulate material is retained in the storage hopper as the air is further drawn to the vacuum air means; the means for removing the stored particulate material from the recovery chamber hopper for reuse includes passage means at the bottom of the hopper interconnecting the recovery chamber and the blast head through which particulate material in the recovery chamber hopper may be transferred to the blast head for reuse; the means for removing the stored particulate material from the recovery chamber hopper further includes a valve means in the passage means adapted to selectively open and close the communication of particulate material between the recovery chamber and head; the recovery chamber further includes valve means in the recovery chamber adapted to block the vacuum flow of air through the chamber and the suction means whereby recovery of the leakage particulate material is correspondingly blocked wherein the recovery chamber further includes a first actuator on the passage valve means and a second actuator on the vacuum air valve means wherein the recovery chamber may be operated in a first mode by closing the passage valve means and opening the vacuum valve means whereby leakage particulate material is recovered through the suction means and deposited for interim storage in the hopper of the recovery chamber and a second mode by opening the passage valve means and closing the vacuum valve means whereby the recovered leakage particulate material deposited in the hopper is transferred through the passage to the blast head for reuse.

3. In a blasting device having a blast head with an opening through which particulate material is projected at high velocity onto a surface for the treatment thereof, the device including sealing means around the opening adapted to contain most of the blasted particulate material within the blasting device for recycling; means for recovering and recycling particulate leakage material not contained by the sealing means including wiper means encircling the opening and the sealing means, the wiper means adapted to substantially contain leakage particulate material between said wiper means and the sealing means; a first suction means adjacent one side of the blast opening substantially between the sealing means and the wiper means, the one side defining the trailing edge of the opening for blast head movement in a first direction; a second suction means adjacent the opposed side of the opening substantially between the sealing means and the wiper means, the second side defining the trailing edge of the opening for blast head movement in a second opposed direction; first and second recovery chambers in pressure communication with the first and second suction means, respectively; said suction means adapted for removing the contained leakage particulate material with a subatmospheric pressure is applied to the respective recovery chambers and said recovery chambers adapted to receive and collect leakage particulate material from the suction means only when a subatmospheric pressure is applied thereto; means for generating a subatmospheric pressure; means for applying a subatmospheric pressure from the pressure means to the first chamber only during blast head movement in the first direction; means for applying a subatmospheric pressure from the pressure mean to the second chamber only during blast head movement in the second direction; means operatively interconnecting the first recovery chamber and blast head only during movement of the blast head in the second direction whereby leakage particulate material collected in said first recovery chamber during movement of the blast head in the second direction is transferred to the blast head; means operatively interconnecting the second recovery chamber and blast head only during movement of the blast head in the first direction whereby leakage particulate material collected in said second recovery chamber during movement of the blast head in the first direction is transferred to the blast head.

4. In a blasting device having a blast head with an opening through which particulate material is projected at high velocity onto a surface for the treatment thereof, the device including sealing means around the opening adapted to contain most of the blasted particulate material within the blasting device for recycling; means for recovering and recycling particulate leakage material not contained by the sealing means including wiper means encircling the opening and the sealing means, the wiper means adapted to substantially contain leakage particulate material between said wiper means and the sealing means; at least one suction means, each suction means being disposed adjacent a side of the blast opening substantially between the sealing means and the wiper means, each side defining the trailing edge of the opening for blast head movement in a respective predetermined direction; a separate recovery chamber in pressure communication with each of the suction means; said suction means adapted for removing the contained leakage particulate material when a subatmospheric pressure is applied to the respective recovery chambers and said recovery chambers adapted to receive and collect leakage particulate material from the suction means only when a subatmospheric pressure is applied thereto; means for generating a subatmospheric pressure; means for applying a subatmospheric pressure from the pressure means to each of the chambers, said subatmospheric pressure being applied to each chamber only during blast head movement in the respective predetermined direction; means associated with each recovery chamber for operatively interconnecting said each recovery chamber with the blast head only when the subatmospheric pressure is not applied to the recovery chamber whereby leakage particulate material collected in a recovery chamber during movement of the blast head in the respective predetermined direction is transferred to the blast head when the blast head is not moving in the respective predetermined direction.

5. The process of recovering and recycling leakage particulate material using apparatus substantially as set forth in Claim 4 including: the step of passing the blast head over the surface to be treated in the respective predetermined direction such that a suction means is disposed rearwardly along the trailing edge of the sealing means; the step of drawing vacuum air through the suction means and associated recovery chamber thereby to recover leakage particulate material trailing from the sealing means and to deposit said material in the recovery chamber; and the step of transferring the deposited material to the blast head for recycling thereof.

6. The blasting process of claim 5 including the further step of interrupting the drawing of vacuum air through the suction means and recover chamber during the particulate material transfer step.

7. The process of recovering and recycling leakage particulate material using apparatus substantially in accordance with claim 3 including the step of treating a surface by moving the blast head in the first direction; the step of drawing vacuum air through the first recovery chamber and first suction means while moving the blast head for surface treatment in said first direction; the step of transferring leakage particulate material deposited in the second recovery chamber to the blast head for recycling thereof while moving the blast head in said first direction; the step of treating a surface by moving the blast head in the second direction; the step of drawing vacuum air through the second recovery chamber and second suction means while moving the blast head for surface treatment in said second direction; and the step of transferring leakage particulate material deposited in the first recovery chamber to the blast head for recycling thereof while moving the blast head in said second direction.

8. In a blasting device having a blast head with an opening through which particulate material is projected at high velocity onto a surface for the treatment thereof, the device including sealing means around the opening adapted to contain most of the blasted particulate material within the blasting device for recycling; means for recovering and recycling particulate leakage material not contained by the sealing means including wiper means encircling the opening and the sealing means, the wiper means adapted to substantially contain leakage particulate material between said wiper means and the sealing means; a first suction means adjacent one side of the blast opening substantially between the sealing means and the wiper means, the first side defining the trailing edge of the opening for blast head movement in a first direction; a second suction means adjacent the opposed side of the opening substantially between the sealingmeans and the wiper means, the second side defining the trailing edge of the opening for blast head movement in a second opposed direction; said suction means adapted for removing the contained leakage particulate material; first and second recovery chambers operatively connected to the first and second suction means, respectively, and to the blast head; the process including the step of treating a surface by moving the blast head in the first direction; the step of drawing vacuum air through the first recovery chamber and first suction means while moving the blast head for surface treatment in said first direction; the step of transferring leakage particulate material deposited in the second recovery chamber to the blast head for recycling thereof while moving the blast head in said first direction; the step of treating a surface by moving the blast head in the second direction; the step of drawing vacuum air through the second recovery chamber and second suction means while moving the blast head for surface treatment in said second direction; and the step of transferring leakage particulate material deposited in the first recovery chamber to the blast head for recycling thereof while moving the blast head in said second direction; the step of interrupting vacuum air through the first recovery chamber and first suction means during particulate material transfer from the first recovery chamber and the step of interrupting vacuum air through the second recovery chamber and second suction means during particulate material transfer from the second recovery chamber.

* * * * *